No. 821,892. PATENTED MAY 29, 1906.
T. G. SHULER.
AGRICULTURAL IMPLEMENT.
APPLICATION FILED AUG. 28, 1905.
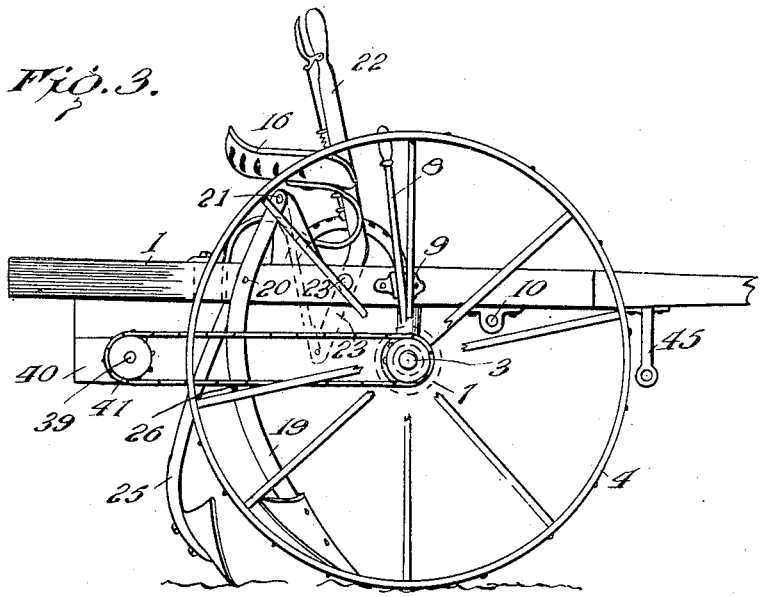
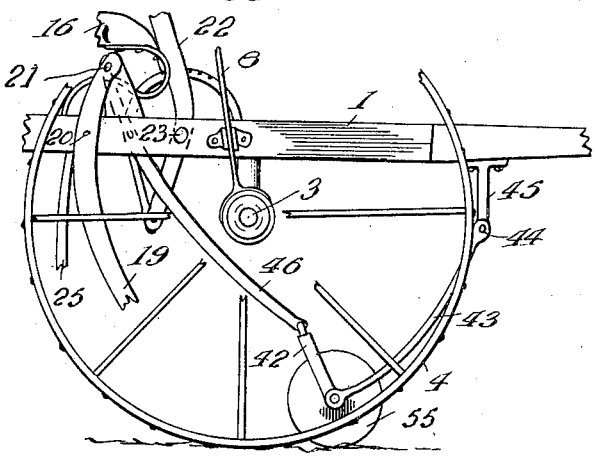

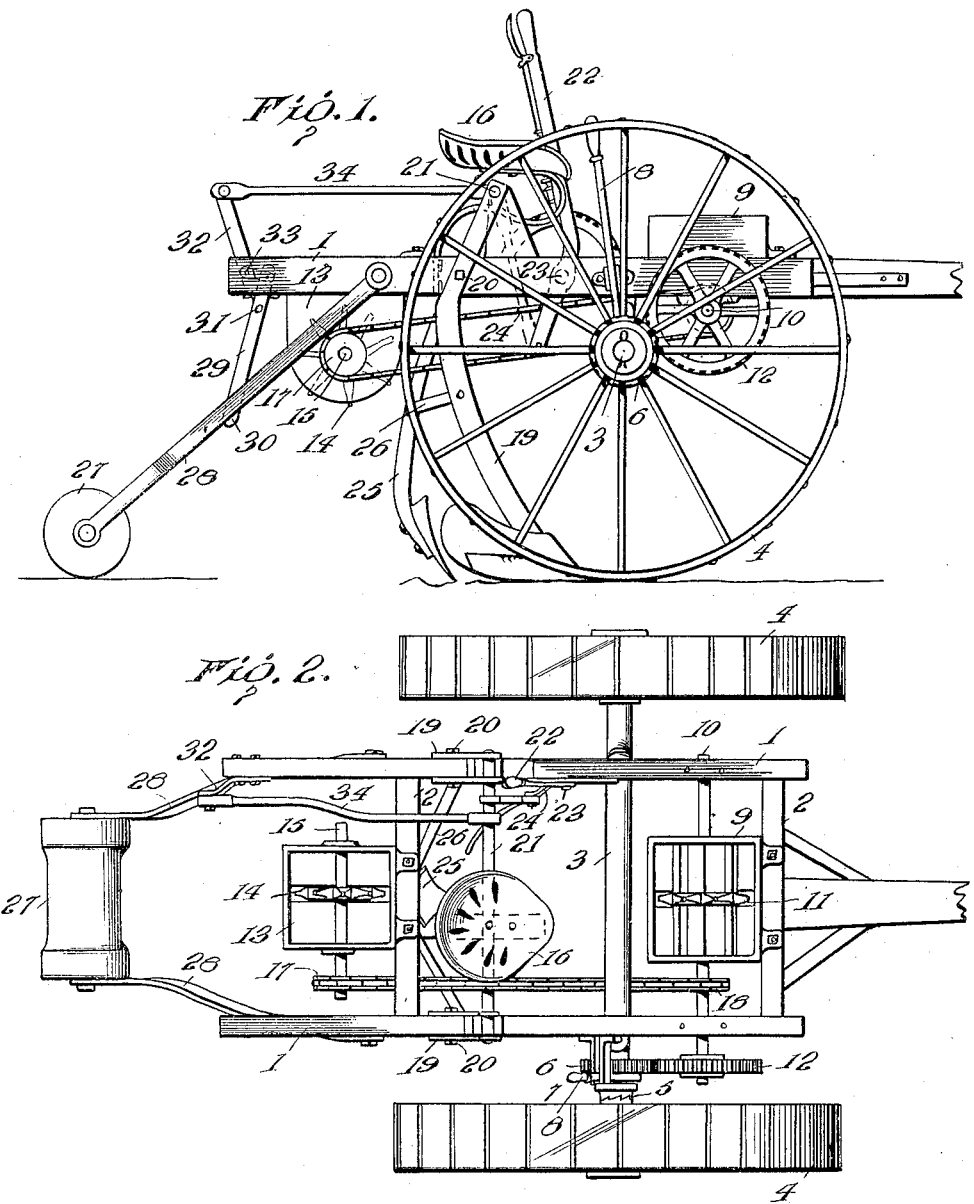

UNITED STATES PATENT OFFICE.

THEODORE G. SHULER, OF ELLOREE, SOUTH CAROLINA.

AGRICULTURAL IMPLEMENT.

No. 821,892.  Specification of Letters Patent.  Patented May 29, 1906.

Application filed August 28, 1905. Serial No. 276,153.

*To all whom it may concern:*

Be it known that I, THEODORE G. SHULER, a citizen of the United States, residing at Elloree, in the county of Orangeburg and State of South Carolina, have invented certain new and useful Improvements in Agricultural Implements, of which the following is a specification.

This invention, in common with agricultural machinery such as heretofore devised for field operations in cultivating and planting, is designed to meet the requirement for an implement capable of a variety of uses and work, thereby saving time, minimizing expense, and avoiding the necessity for a separate mechanism for each kind of work and storage-space for housing the same.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a side elevation of an implement embodying the invention. Fig. 2 is a top plan view thereof. Fig. 3 is a view similar to Fig. 1, showing the broadcast planter attachment in position and the fertilizer-distributer and drill omitted. Fig. 4 is a detail view showing the manner of simultaneously adjusting the stalk-chopper and cultivator-shovels. Fig. 5 is a detail perspective view of the stepped block constituting a rest for the cultivator-standards when adjusted.

Corresponding and like parts are referred to in the following description and indicated in all the views of the drawings by the same reference characters.

The framework of the machine comprises longitudinal bars 1 and transverse bars 2, the same being readily connected at their indicating-points. The axle 3 is fixed and drive-wheels 4 are loosely mounted upon the spindle-arms thereof. A gear element is loosely mounted upon an end portion of the axle 3, and a clutch 5 is provided between it and the adjacent drive-wheel to cause both to rotate together.

A shipper-lever 8 provides convenient means for throwing the gear element into and out of clutched engagement with the drive-wheel. A hopper 9, for receiving the fertilizer, is arranged upon the front portion of the machine, and a hopper 13, for receiving the seed, is located upon the rear portion of the machine.

The standards 19, provided at their lower ends with the cultivator-shovels, are pivotally connected to the side bars 1 and 20 and are connected at their upper ends by means of a transverse rod 21, which has its end portions extended across the bars 1. An operating-lever 22, fulcrumed at 23 to a side bar, is connected at its lower end by means of a link or bar 24 with the transverse rod 21 to admit of adjusting the inclination of the cultivator-shovels as may be required. The operating-lever 22 is held in the required position by the usual end latch and toothed bar. An intermediate standard 25 is connected at its upper end to the transverse rod 21, and braces 26 connect its lower portion to the standards 19. The standard 25 is provided with a cultivator-shovel of desired pattern and is centrally disposed so as to form a trench into which the seed is dropped.

The coverer 27 consists of a roller made concave or hollow intermediate of its ends and journaled between bars 28, which are pivoted at their upper ends to the rear portion of the bars 1. Lifting means are provided for elevating the coverer preliminary to turning the machine either for recrossing the field or other purpose. These lifting means comprise a lever 29, having a lateral extension 30, projected across the path of a bar 28 and pivoted at 31 to a bracket pendent from the rear end of a side bar 1, also a lever 32, fulcrumed at 33 and having its upper end connected by rod 34 with the transverse rod 21. The lower end of the lever 32 extends within the path of the upper end of the lever 29. A rearward movement of the upper end of lever 32 effects a corresponding forward movement of the lower end of said lever, which, coming in contact with the upper end of lever 29, moves it so as to cause a lifting of the coverer 27 in the manner stated. When it is required to lift the cultivator-shovels and the coverer to enable the machine to turn readily, the upper end of the operating-lever 22 is drawn rearward, thereby effecting simultaneous movement of the cultivator-shovels and coverer in the manner specified.

For chopping stalks preliminary to plowing the field, a rotary chopper 55 is provided and mounted in an arch 42 and bars 43, the latter being pivotally connected at 44 to brackets 45, pendent from the bars 1. A connection 46 joins the arch 42 to the transverse rod 21, whereby upon rearward movement of said rod to effect a lifting of the cultivator-shovels and coverer the chopper is likewise elevated. It is to be understood that when the chopper is in active operation the planting attachments are inactive, and the coverer 27 is either removed from the machine or turned so as to be out of the way.

When the implement is used solely in the capacity of a cultivator, the shovels and their supporting-standards are subjected to great strain, and in order that the operating-lever 22 and the connections between it and the standards 19 may be relieved of such strain rests 47 are provided, the same consisting of plates or blocks having an end portion stepped, as shown at 48, (see Fig. 5,) to provide a series of shoulders upon any one of which the end portions of the transverse rod 21 are adapted to obtain a purchase. These rests are adjustable upon the side bars 1 and are longitudinally slotted, as shown at 49, and are held in the required position by means of suitable fastenings 50, such as lag screws or bolts.

From the foregoing it will be readily understood that the implement may be readily adapted for different work and involves a simple and compact structure and is comparatively of light draft and involves a minimum number of parts and is adapted to be converted from one implement to the other by the average person without requiring the use of special tools or skill.

Having thus described the invention, what is claimed as new is—

1. In an implement of the character described, the combination of the main frame, standards pivotally connected thereto, means for adjusting said standards to regulate the pitch of the shovels, an intermediate standard connected with the upper ends of the first-mentioned standards, and braces connecting the lower portions of the several standards.

2. In an implement of the character described, the combination of the main frame, standards pivoted thereto at a point between their ends, a transverse rod connecting the upper ends of said standards, means for adjusting the standards to vary the pitch of the shovels, an intermediate standard connected at its upper end to the said transverse rod, and braces connecting the lower portions of the several standards.

3. In combination, a main frame, standards pivoted thereto, a transverse rod connecting the upper ends of the standards and arranged above said main frame, and stepped rests adjustable upon the main frame and adapted to receive the said transverse rod and hold the standards in the adjusted position.

4. In combination, a main frame, standards pivoted thereto and provided with shovels, bars pivoted to the said frame and provided with a device to operate in the rear of said shovels, a lever pivotally connected to the main frame a short distance from its upper end and having a portion extended across the path of one of said pivoted bars, a coöperating lever pivoted near its lower end to the main frame, and an operating-lever adapted to effect simultaneous movement of the standards and pivoted bars.

In testimony whereof I affix my signature in presence of two witnesses.

THEODORE G. SHULER. [L. S.]

Witnesses:
 FRANK C. BRYANT,
 WM. L. GLAZE.